United States Patent [19]
Ono et al.

[11] Patent Number: 5,256,739
[45] Date of Patent: Oct. 26, 1993

[54] GRAFT COPOLYMER, METHOD OF PRODUCING THE SAME, AND COVERING COMPOSITION CONTAINING THE SAME AS MAIN COMPONENT

[75] Inventors: Ichiro Ono, Gunma; Hiroshi Yoshioka, Tokyo, both of Japan

[73] Assignee: Shin-Etsu Chemical Co., Ltd., Tokyo, Japan

[21] Appl. No.: 676,006

[22] Filed: Mar. 27, 1991

[30] Foreign Application Priority Data

Mar. 28, 1990 [JP] Japan .................................. 2-82036

[51] Int. Cl.$^5$ ........................................... C08F 265/04
[52] U.S. Cl. .................................... 525/412; 525/415; 526/245; 526/279
[58] Field of Search ................ 525/412, 415; 526/245, 526/279

[56] References Cited

U.S. PATENT DOCUMENTS

| | | | |
|---|---|---|---|
| 4,701,483 | 10/1987 | Okitsu | 523/500 |
| 5,039,761 | 8/1991 | Ono et al. | 525/479 |

FOREIGN PATENT DOCUMENTS 2-080415-A 3/1990 Japan .

Primary Examiner—Melvyn I. Marquis
Assistant Examiner—D. Aylward
Attorney, Agent, or Firm—Millen, White, Zelano & Branigan

[57] ABSTRACT

Graft copolymers containing a vinyl polymer as a trunk polymer component, and both organopolysiloxane and polylactone as a branch polymer component, and methods of producing them. Covering compositions containing said graft copolymers as a major component can form coats excellent in not only heat resistance and hardness, but also flexibility, weather resistance, water repellability, stain resistance, mold releasability, lubricity and so on.

12 Claims, 1 Drawing Sheet

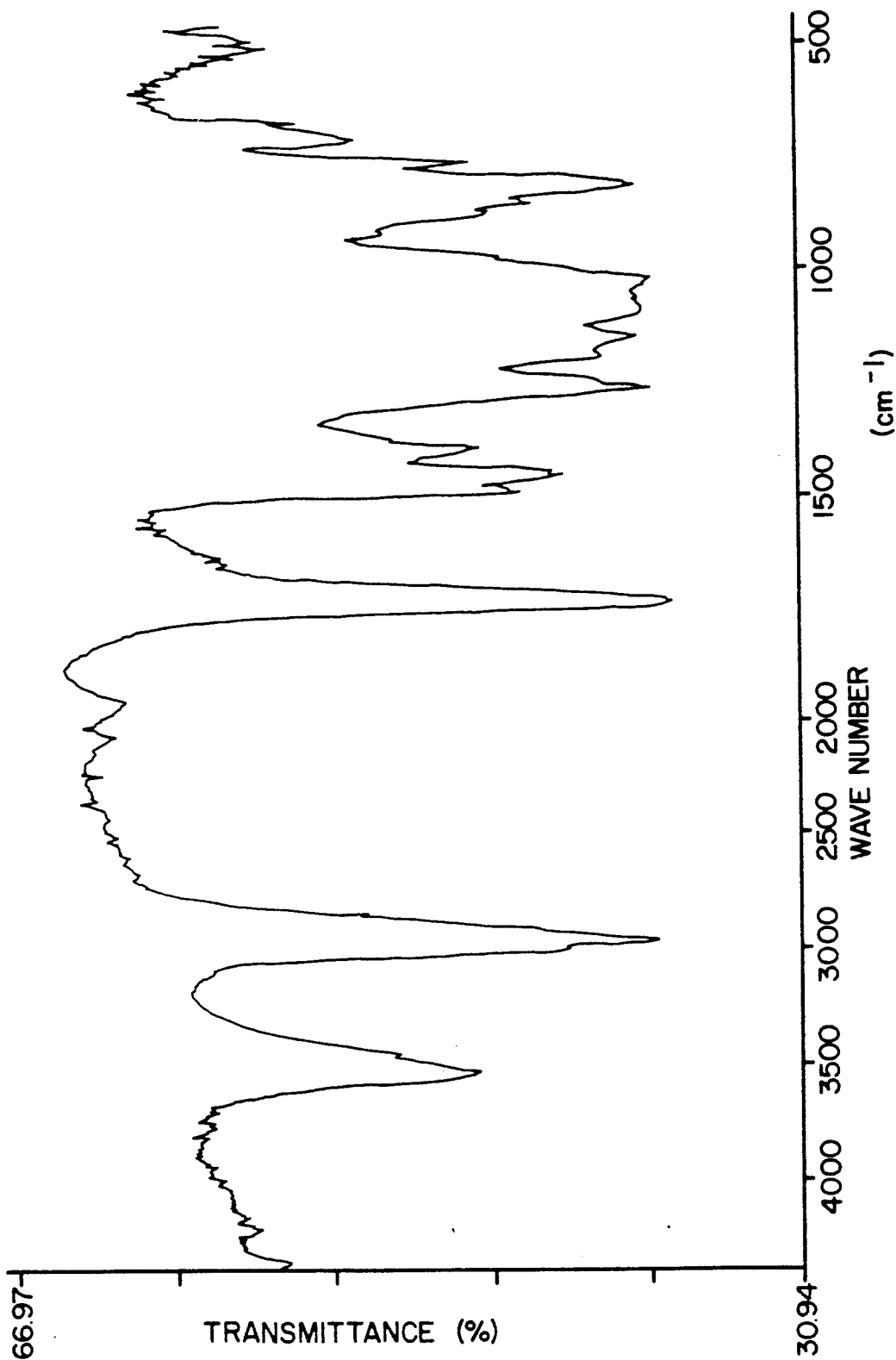

GRAFT COPOLYMER, METHOD OF PRODUCING THE SAME, AND COVERING COMPOSITION CONTAINING THE SAME AS MAIN COMPONENT

FIELD OF THE INVENTION

This invention relates to a graft copolymer containing both organopolysiloxane and polylactone as branch components, a method of producing said graft copolymer, and a covering composition containing said graft copolymer as a main component.

BACKGROUND OF THE INVENTION

Organopolysiloxane has so far been used as additive or modifier with an intention of imparting various useful functions to paint and varnish. On the other hand, study of silicone type graft copolymers prepared utilizing silicone monomers on the basis of the recent advancement in macromonomer technique have been made extensively. These copolymers have absorbed much interest as a coating material excellent in weather resistance, water repellability, stain resistance, mold releasability, lubricity, and so on [as disclosed in Japanese Kokai Nos. 154766/58, 20360/59, 126478/59, 151272/61 and 156172/62 (The term "Japanese Kokai" as used herein means an "unexamined published Japanese patent application")].

However, all of those graft copolymers are prepared from a radical polymerizable group-containing organopolysiloxane and radical polymerizable monomer(s). More specifically, their major component is a graft copolymer which contains organopolysiloxane as the branch component and an acrylic polymer as the trunk component.

Consequently, when the trunk polymer has a high glass transition point, the coat obtained is hard and excellent in thermal resistance, on the one hand, but fragile and devoid of flexibility on the other hand. Therefore, when it is designed so as to have a low glass transition point with the intention of heightening the flexibility, the coat formed becomes tacky and soft. That is, conventional silicone type graft copolymers have a defect that they cannot provide a satisfactory coat.

As a result of concentrating our energies on elimination of the above-described defect, it has now been found that a coating composition whose major component is a graft copolymer containing both organopolysiloxane and polylactone as branch components is excellent in not only weather resistance, water repellability, stain resistance, mold releasability and lubricity, but also flexibility and impact resistance, so it is best suited to be used as a weather resisting coating material for construction use, a coating material for preventing water and snow from adhering, a coating material for protection from patching paper and scribbling, a coating material for protection from sea water stains, a water proof coating material for concrete, a coating agent for backing ink ribbon used for heat-sensitive transfer recording, a coating agent for backing magnetic tapes, and so on, thus achieving this invention.

SUMMARY OF THE INVENTION

Therefore, a first object of this invention is to provide a novel resin which can form a coat having not only thermal resistance, but also hardness and flexibility.

A second object of this invention is to provide a method of producing a resin excellent in all of the thermal resistance, hardness and flexibility.

A third object of this invention is to provide a covering composition suitable for weather resisting paint and varnish, waterproof and stainproof paint and varnish, back coat of magnetic tape, and so on.

The above-described objects of this invention is attained with a graft copolymer which contains a vinyl polymer as its trunk polymer component, and both organopolysiloxane and polylactone as its branch polymer components, a method of producing said graft copolymer, and a covering composition using said graft copolymer.

When the graft copolymer of this invention is made into a covering composition containing said graft copolymer as its major component, the coat formed can acquire excellent characteristics which have so far failed to be realized.

BRIEF DESCRIPTION OF DRAWING

FIG. 1 is an infrared spectrum of the copolymer produced in Example 1 in accordance with this invention.

DETAILED DESCRIPTION OF THE INVENTION

The graft copolymer of this invention comprises the following constitutional units (a) and (b), and can be produced to advantage using two methods described below:

(a):

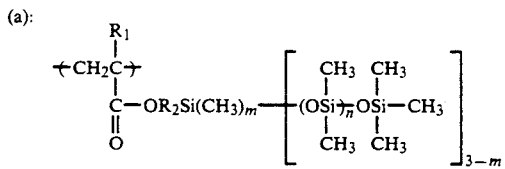

wherein $R_1$ represents a hydrogen atom or a methyl group; $R_2$ represents a divalent hydrocarbon residue containing 1 to 11 carbon atoms, whose carbon chain may be interrupted by an oxygen atom; m represents 0, 1 or 2; and n represents an average degree of polymerization, and ranges from 0 to 200;

(b):

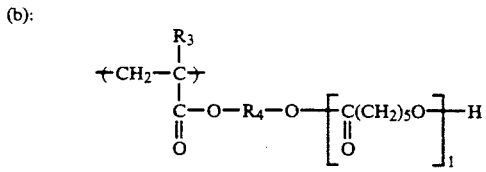

wherein $R_3$ represents a hydrogen atom or a methyl group; $R_4$ represents a divalent hydrocarbon residue containing 2 to 4 carbon atoms; l represents an average degree of polymerization, and ranges from 3 to 20.

Synthesis Method (1):

This method consist in copolymerization of a radical polymerizable group-containing dimethylpolysiloxane compound, a radical polymerizable group-containing polycaprolactone compound and radical polymerizable group-containing monomer(s). Therein, the compounds represented by the following general formula (A) are preferred as the radical polymerizable group-containing dimethylpolysiloxane compound.

(A):

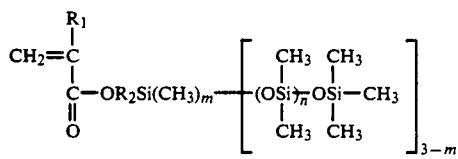

wherein $R_1$, $R_2$, m and n have the same meanings as in the foregoing constitutional unit (a), respectively.

The compounds represented by the above-illustrated general formula (A) can be prepared from (metha)acrylate-substituted chlorosilane compounds represented by the following general formula (B) and terminal hydroxyl group-substituted dimethylpolysiloxanes represented by the following general formula (C) by subjecting them to dehydrochlorination in a conventional manner:

(B):

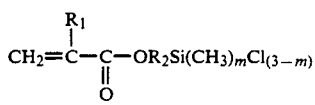

(C):

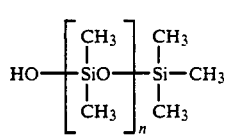

wherein $R_1$, $R_2$, m and n have the same meanings as in the foregoing general formula (A), respectively.

Specific examples of the compounds of the foregoing formula (A) are illustrated below.

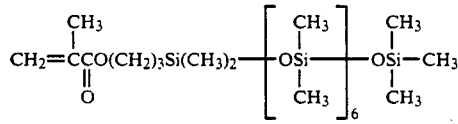

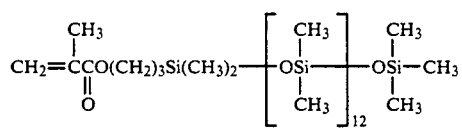

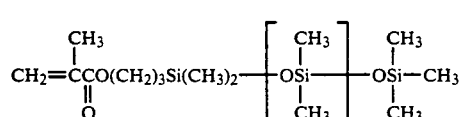

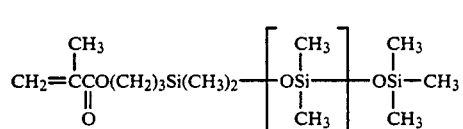

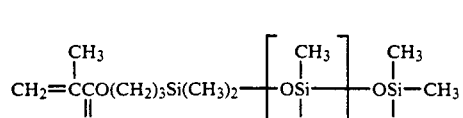

-continued

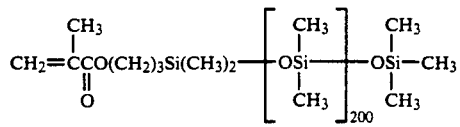

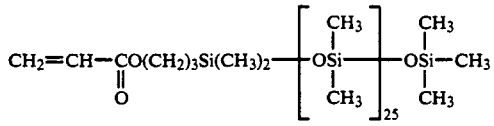

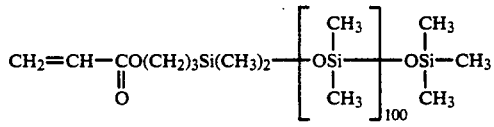

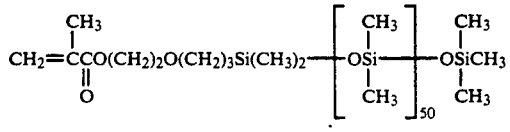

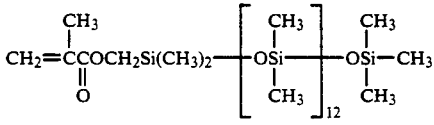

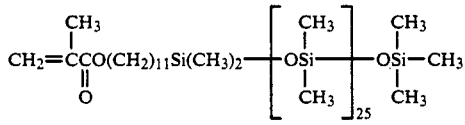

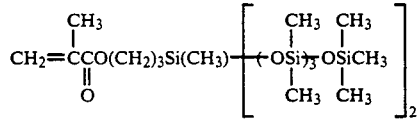

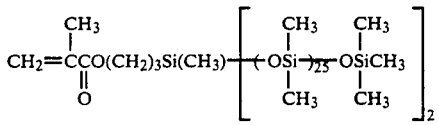

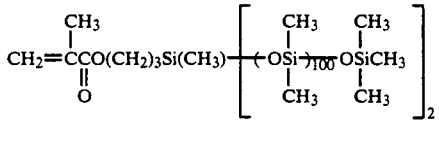

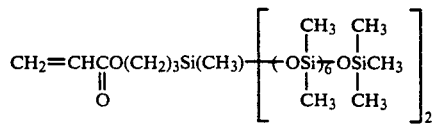

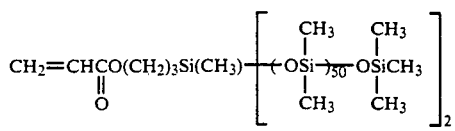

-continued

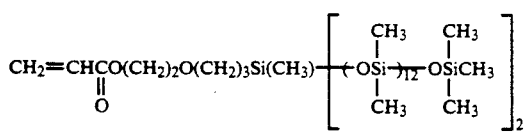

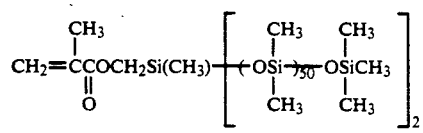

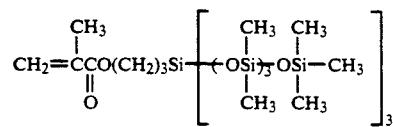

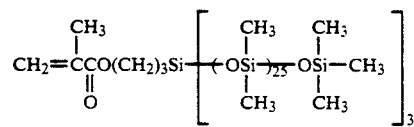

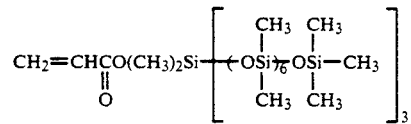

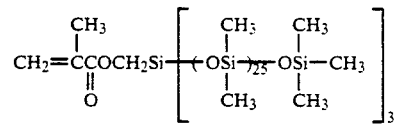

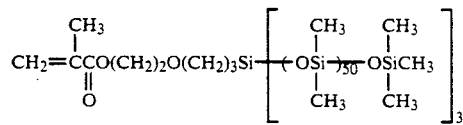

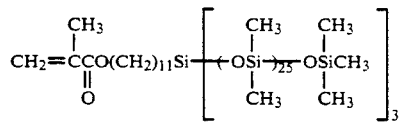

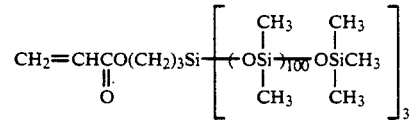

On the other hand, compounds represented by the following general formula (D) are preferred as the radical polymerizable group-containing polycaprolactone compound:

(D):

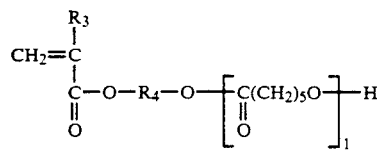

wherein $R_3$, $R_4$ and $l$ have the same meanings as in the foregoing constitutional unit (B), respectively.

The compounds represented by the above-illustrated general formula (D) can be obtained, e.g., by subjecting ε-caprolactone having the following structural formula (F) to ring-opening polymerization using hydroxyl group-containing radical polymerizable monomers represented by the following general formula (E) as a polymerization initiator:

(E):

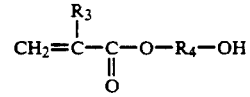

wherein $R_3$ and $R_4$ have the same meanings as in the foregoing general formula (D), respectively, (F):

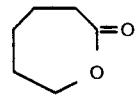

Specific examples of the compounds represented by the foregoing general formula (D) are illustrated below.

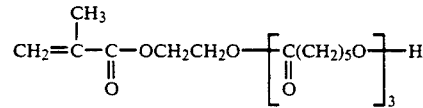

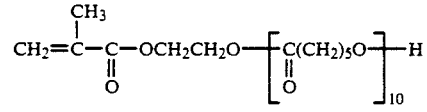

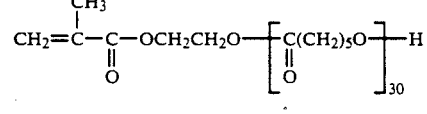

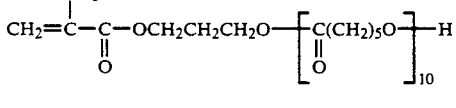

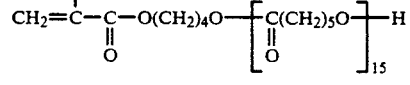

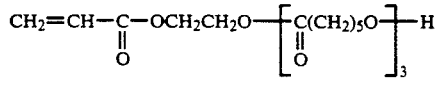

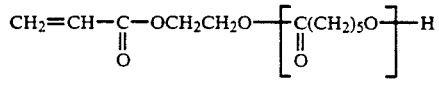

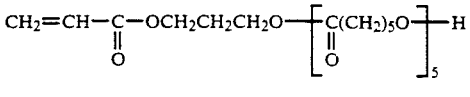

-continued

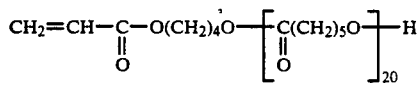

The copolymers of this invention are obtained using a radical polymerizable monomer in addition to the above-described compounds (A) and (D), and subjecting them to copolymerization reaction.

Suitable examples of radical polymerizable monomers which can be copolymerized with the above-described compounds (A) and (D) include (metha)acrylic acid, various derivatives of (metha)acrylic acid, including alkyl esters such as methyl(metha)acrylate, butyl(metha) acrylate, 2-ethylhexyl(metha)acrylate, etc., hydroxyalkyl esters such as hydroxyethyl(metha)acrylate, hydroxypropyl(metha)acrylate, hydroxybutyl(metha)acrylate, etc., acid amides such as acrylamide, etc., perfluoroesters such as perfluorodecylethyl(metha)acrylate, perfluorooctylethyl(metha)acrylate, perflu orohexylethyl(metha)acrylate, perfluorobutylethyl(metha)acrylate, etc., and the like; styrene or styrene derivatives; fumaric acid, maleic acid and derivatives thereof; radical polymerizable silicon compounds such as vinyltrimethoxysilane, γ-methacryloxypropyltrimethoxysilane, etc.; acrylonitrile; vinylpyrrolidone; vinyl acetate; vinyl alkyl ethers; and so on.

These radical polymerizable monomers can be used alone, or in combination with two or more thereof.

The copolymerization can be effected in the presence of an ordinary radical polymerization initiator, e.g., peroxides such as benzoyl peroxide, dicumyl peroxide, etc.; azocompounds such as azobisisobutyronitrile, etc.; and so on. Thereto, any of a solution polymerization method, an emulsion polymerization method, a suspension polymerization method and a block polymerization method can be applied.

Among these polymerization methods, a solution polymerization method is favored in particular, because it facilitates the adjustment of a molecular weight of the copolymer to be obtained to the optimal range. Suitable solvents for the solution polymerization include aromatic hydrocarbons such as benzene, toluene, xylene and the like; ketones such as methyl ethyl ketone, methyl isobutyl ketone and the like; esters such as ethyl acetate, isobutyl acetate and the like; and so on. Such solvents may be used alone, or as a mixture of two or more thereof.

In addition, the copolymerization reaction is preferably carried out at a temperature of from 50° C. to 180° C., particularly from 60° C. to 120° C. Under these temperatures, the reaction can be completed in 5 to 10 hours.

Synthesis Method (2):

The second synthesis method consists in grafting a polymer obtained by subjecting ε-caprolactone to ring-opening polymerization upon a copolymer obtained by copolymerizing a radical polymerizable group-containing dimethylpolysiloxane compound, a hydroxyl group-containing radical polymerizable monomer and radical polymerizable monomer(s) of the kind which can undergo copolymerization with the former two constituent monomers. The radical polymerizable group-containing dimethylpolysiloxane compound and the hydroxyl group-containing radical polymerizable monomer used herein are the same as the compounds (A) and (E), respectively, used in the foregoing synthesis method (1).

As examples of radical polymerizable monomers which can be copolymerizable with the compounds (A) and (E) and used in the above-described copolymerization, mention may be made of various derivatives of (metha)acrylic acid, including alkyl esters such as methyl(metha)acrylate, butyl(metha)acrylate, 2-ethylhexyl(metha)acrylate, etc., perfluoro esters such as perfluorodecylethyl (metha) acrylate, perfluorooctylethyl(metha)acrylate, perfluorohexylethyl(metha)acrylate, perfluorobutylethyl(metha)acrylate, etc., and so on; styrene and derivatives thereof; radical polymerizable silicon compounds; acrylonitrile, vinylpyrrolidone, vinyl acetate, vinyl alkyl ether, and so on.

These radical polymerizable monomers can be used independently or in combination with two or more thereof.

Usable methods for copolymerization include the same ones as in the first synthesis method (1).

The ring-opening graft copolymerization between a lactone, such as ε-caprolactone, etc., and the silicone type graft copolymers obtained in the foregoing copolymerization can be effected in an atmosphere of nitrogen under temperature of from 100° C. to 200° C. using an organometallic compound or the like as a catalyst. An appropriate reaction time therein ranges from 2 to 10 hours. As examples of solvents preferably used therein, mention may be made of aromatic hydrocarbons such as toluene, xylene, and the like; aliphatic hydrocarbons such as n-octane, n-decane and the like; ketones such as methyl isobutyl ketone, cyclohexanone and the like, and so on.

Examples of the above-described organometallic compounds include dibutyltin dioctate, dibutyltin dilaurate, tetrapropyl titanate, tetrabutyl titanate, and so on.

According to any of the foregoing synthesis methods (1) and (2), a graft copolymer comprising the constitutional units of the foregoing formulae (a) and (b) can be obtained finally.

Although suitable fractions of the constitutional units (a) and (b) in the graft copolymer of this invention cannot be definitely given because they depend on the kinds of their own and those of other radical polymerizable monomers, it can be generally said that a suitable fraction of the constitutional unit (a) ranges from 5 to 80 wt %, preferably from 10 to 60 wt %, and that of the constitutional unit (b) ranges from 2 to 50 wt %, preferably from 5 to 30 wt %.

When the constitutional unit (a) is contained in a fraction less than 5 wt %, the water repellability, the stain resistance, the mold releasability and the lubricity of the formed coat become insufficient, whereas when its fraction is increased beyond 80 wt % the lowering of film formability is caused. On the other hand, when the constitutional unit (b) is contained in a fraction less than 2 wt % the flexibility of the formed coat becomes insufficient, whereas when its fraction is increased beyond 50 wt % the hardness and the appearance of the formed coat become unsatisfactory.

Next, a covering composition containing as a main component the graft copolymer of this invention is described in detail.

In addition to the above-described graft copolymers, it is possible in the covering composition of this invention to contain an arbitrary combination of various additives including solvents, cross-linking agents, other resins, fillers and so on.

Solvents are used for the purposes of viscosity adjustment of the composition, thickness adjustment of the coat, and so on. They don't have any particular restriction so far as they are compatible with the graft copolymers of this invention. Examples of solvents which can be used for the above-described purposes include aromatic hydrocarbons such s benzene, toluene, xylene and the like; aliphatic hydrocarbons such as n-hexane, n-octane, n-decane and the like; chlorinated compounds such as methylene chloride, chloroform, carbon tetrachloride and the like; ketones such as methyl ethyl ketone, methyl isobutyl ketone, cyclohexanone and the like; esters such as ethyl acetate, butyl acetate and the like; dioxane; dimethylformamide; and so on. These solvents can be used alone or as a mixture of two or more thereof.

The graft copolymers of this invention can be converted into an ordinary temperature drying type coating material of high quality simply by dissolving them in the above-cited solvents. Also, it is feasible to convert the above-cited coating material to an ordinary temperature curable coating materials which can provide a coat excellent in solvent resistance by further compounding with a polyfunctional isocyanate compound as a cross-linking agent.

Polyfunctional isocyanate compounds used as a crosslinking agent in the foregoing case have no particular limitation, provided that they have two or more of functional groups. Specific examples thereof include diisocyanates such as tolylenediisocyanate (TDI), diphenylmethanediisocyanate (MDI), tolidine-diisocyanate (TODI), naphthalenediisocyanate (NDI), hexamethylenediisocyanate (HDI), isophorone-diisocyanate (IPDI), xylylenediisocyanate (XDI), etc., and polyisocyanates such as trimethylolpropane (TMP), modified TDI, isocyanurate combined TDI, TMP modified HDI, isocyanurate combined HDI, biuret combined HDI, TMP modified TPDI, isocyanurate combined IPDI, etc.

Such isocyanate compound as cited above is preferably compounded in a proportion of 0.5 to 2.0 equivalents, particularly 0.8 to 1.5 equivalents, to one equivalent of hydroxyl group in the graft copolymer of this invention. In this case also, it is possible to accelerate the curing of the coat by addition of a trace amount of organotin compound, e.g., dibutyltin dioctate, dibutyltin dilaurate or the like, as cross-linkage accelerator.

The covering composition of this invention, though contains the graft copolymer of this invention as its major component, may be compounded with other organic resins, e.g., acrylic resins, polyester resins, epoxy resins, alkyd resins, etc., if desired.

In addition, an inorganic filler such as silica, alumina, glass powder, clay, talc, calcium carbonate, mica powder, titanium dioxide, wollastonite, magnesium oxide or so on may be added for the purpose of heightening the strength of the coat. Further, other additives, e.g., an antioxidant, an ageing inhibitor, an antistatic agent, a coloring agent and so on, may be mixed.

When the graft copolymer of this invention is made into a covering composition containing it as its major component, the organopolysiloxane as one branch component is concentrated at the coat surface to exhibit its characteristics, namely weather resistance, water repellability, stain resistance, mold releasability and lubricity, and the polylactone as the other branch component remains inside the coat to function so as to heighten the flexibility. Consequently, the coat formed can acquire excellent characteristics which have so far failed to be realized.

EXAMPLES

Now, this invention will be illustrated in more detail by reference to the following examples. However, the invention should not be construed as being limited to these examples.

Additionally, the term "hydroxyl equivalent" used in the following examples describes the numerical value calculated from the hydroxyl value of JIS (Japan Industrial Standard) K0070 described below.

Determination of Hydroxyl Value (JIS K0070):

An acetylating agent consisting of acetic anhydride and pyridine was added to a sample, and then heated to acetylate the hydroxyl groups in the sample. Thereafter, excess acetic anhydride was decomposed to acetic acid by addition of water, and the resulting acetic acid was subjected to neutralization titration with a 0.5N ethanol solution of potassium hydroxide.

$$\text{Hydroxyl Value (mg KOH/g)} = \frac{(\alpha - \beta) \times f \times 28.05}{S} + D$$

$\alpha$: a volume(ml) of 0.5N ethanol solution of potassium hydroxide used in a blank test.

$\beta$: a volume (ml) of 0.5N ethanol solution of potassium hydroxide used in this test.

f: a factor of the 0.5N potassium hydroxide used.

S: the sample examined (g).

D: acid value.

Hydroxyl Equivalent (g/mol) =

$$\frac{\text{Molecular weight of KOH} \times 1,000}{\text{Hydroxy Value}} \times \frac{100}{\text{solid concentration (\%)}}$$

EXAMPLE 1

35 parts by weight (abbreviated as pts. wt.) of the compound represented by the following chemical formula (A-1) (as the radical copolymerizable group-containing dimethylpolysiloxane compound of the foregoing general formula (A)), 5 pts. wt. of the compound represented by the following chemical formula (D-1) (as the radical polymerizable group-containing polycaprolactone compound of the foregoing general formula (D)), 50 pts. wt. of methylmethacrylate, 10 pts. wt. of hydroxylethylmethacrylate, 150 pts. wt. of toluene and 2 pts. wt. of azobisisobutyronitrile were placed in a glass-made reactor, and heated at a temperature of 90°–95° C. for 5 hours with stirring in a steam of nitrogen gas to effect the copolymerization reaction. Thus, a viscous solution having a solids concentration of 40 wt % was obtained.

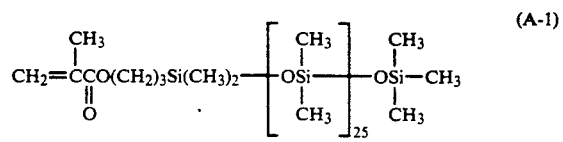

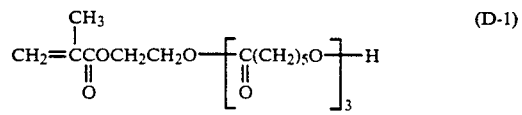

A hydroxyl equivalent of this solution on a solids basis was 1.150 (g/mol).

late, 2-ethylhexyl acrylate, hydroxyethyl methacrylate and perfluorooctylethyl methacrylate, respectively.

TABLE 1

| | Radical polymerizable group-containing dimethylpolysiloxane (A) | | | | | Radical polymerizable group-containing polycaprolactone (D) | | | another copolymerizable monomer (parts by weight) | | | | |
|---|---|---|---|---|---|---|---|---|---|---|---|---|---|
| | $R_1$ | $R_2$ | m | n | parts by weight | $R_3$ | $R_4$ | l | parts by weight | MMA | BMA | 2EHA | HEMA | PFMA |
| EXAMPLE 1 | $CH_3$ | $-(CH_2)_3-$ | 2 | 25 | 35 | $CH_3$ | $-(CH_2)_2-$ | 3 | 5 | 50 | | | 10 | |
| EXAMPLE 2 | $CH_3$ | $-(CH_2)_3-$ | 2 | 25 | 10 | H | $-(CH_2)_2-$ | 10 | 10 | 60 | 10 | 10 | | |
| EXAMPLE 3 | $CH_3$ | $-(CH_2)_3-$ | 2 | 50 | 60 | $CH_3$ | $-(CH_2)_2-$ | 10 | 5 | 35 | | | | |
| EXAMPLE 4 | $CH_3$ | $-(CH_2)_3-$ | 1 | 6 | 35 | $CH_3$ | $-(CH_2)_2-$ | 30 | 30 | 30 | 5 | | | |
| EXAMPLE 5 | H | $-(CH_2)_3-$ | 1 | 25 | 20 | $CH_3$ | $-(CH_2)_4-$ | 5 | 5 | 50 | 5 | | 10 | 10 |
| EXAMPLE 6 | $CH_3$ | $-(CH_2)_3-$ | 1 | 100 | 30 | H | $-(CH_2)_2-$ | 10 | 10 | 50 | | 10 | | |
| EXAMPLE 7 | $CH_3$ | $-CH_2-$ | 1 | 12 | 50 | $CH_3$ | $-(CH_2)_2-$ | 3 | 15 | 35 | | | | |
| EXAMPLE 8 | $CH_3$ | $-(CH_2)_3-$ | 0 | 6 | 35 | $CH_3$ | $-(CH_2)_2-$ | 20 | 10 | 40 | 10 | | | 5 |
| COMP. EXAMPLE 1 | $CH_3$ | $-(CH_2)_3-$ | 2 | 25 | 30 | | | | 0 | 70 | | | | |
| COMP. EXAMPLE 2 | $CH_3$ | $-(CH_2)_3-$ | 2 | 25 | 30 | | | | 0 | 20 | 30 | 10 | 10 | |

| | solvent (parts by weight) | | solid part (%) | Hydroxyl Equivalent of solid part (g/mol) | weight average molecular weight determined by GPC |
|---|---|---|---|---|---|
| | toluene | MIBK | | | |
| EXAMPLE 1 | 150 | | 40 | 1,150 | 28,000 |
| EXAMPLE 2 | 100 | 50 | 40 | 12,500 | 35,000 |
| EXAMPLE 3 | 150 | | 40 | 25,800 | 16,000 |
| EXAMPLE 4 | 50 | 100 | 40 | 11,800 | 23,000 |
| EXAMPLE 5 | | 150 | 40 | 1,180 | 32,000 |
| EXAMPLE 6 | 150 | | 40 | 12,700 | 27,000 |
| EXAMPLE 7 | 150 | | 40 | 3,210 | 21,000 |
| EXAMPLE 8 | 50 | 100 | 40 | 24,300 | 25,000 |
| COMP. EXAMPLE 1 | 150 | | 40 | — | 30,000 |
| COMP. EXAMPLE 2 | 150 | | 40 | 1,300 | 28,000 |

The produced copolymer was precipitated from this solution by adding excess methyl alcohol, followed by washing. These procedures were repeated three times. Then, it was subjected to vacuum drying at 100° C. under a pressure of 10 mmHg. Thus, the intended copolymer was obtained as a white solid. This copolymer was identified as a dimethylpolysiloxane- and polycaprolactone-grafted copolymer from the results of IR spectrum analysis (See FIG. 1) and $^1$H-NMR spectrum analysis.

In addition, a weight average molecular weight of this copolymer determined by GPC was about 28,000, converted to a polystyrene basis.

EXAMPLES 2 TO 8 AND COMPARATIVE EXAMPLES 1 TO 2

Graft copolymers were produced in the same manner as in Example 1, except that the ingredients used in Example 1, that is, the radical polymerizable group-containing dimethylpolysiloxane compound, the radical polymerizable group-containing polycaprolactone compound, the radical polymerizable monomers and the solvent, were changed in kind and amount from those used in Example 1 to those shown in Table 1. A hydroxyl equivalent and a weight average molecular weight of the solids component at the conclusion of the reaction were determined by the same method as used in Example 1. These data were also set forth in Table 1. Additionally, $R^1$, $R^2$, m and n in Table 1 are symbols used in the foregoing general formula (A), and $R^3$, $R^4$ and l are symbols used in the foregoing general formula (D). Moreover, MMA, BMA, 2HEA, HEMA and PHMA represent methyl methacrylate, butyl methacrylate, 2-ethylhexyl acrylate, hydroxyethyl methacrylate and perfluorooctylethyl methacrylate, respectively.

EXAMPLE 9

A copolymerization reaction was carried out under the same condition as in Example 1 using 30 pts. wt. of the same radical polymerizable group-containing dimethylpolysiloxane compound as in Example 1, 1 pt. wt. of hydroxyethyl methacrylate, 50 pts. wt. of methyl methacrylate, 10 pts. wt. of butyl methacrylate, 150 pts. wt. of xylene and 2 pts. wt. of azobisisobutyronitrile, and thereby was obtained a viscous solution containing a solid component in a concentration of 38 wt %.

To the thus obtained graft copolymer solution, 9 pts. wt. of ε-caprolactone and 0.025 pt. wt. of tetrabutyl titanate were added, and heated to a temperature of 140°–145° C. for 5 hours in a stream of nitrogen gas to effect the reaction.

Thus, a viscous solution having a solids concentration of 40 wt % was obtained. A hydroxyl equivalent of this solution was 13,000 (g/mol) on a solids basis. A white solid copolymer was taken out of this solution by performing the same operations as in Example 1, and identified as a dimethylpolysiloxane- and polycaprolactone-grafted copolymer from the IR absorption spectrum analysis and the $^1$H-NMR spectrum analysis.

In addition, a weight average molecular weight of the obtained copolymer determined by GPC was about 31,000, converted to a polystyrene basis.

EXAMPLES 10 TO 13

Graft copolymers were produced in the same manner as in Example 9, except that the radical polymerizable group-containing dimethylpolysiloxane compound, the hydroxyl group-containing radical polymerizable monomer, other copolymerizable monomers and solvents were changed in kind and amount from those in Example 9 to those shown in Table 2, respectively, and the amount of ε-caprolactone was changed to those shown in Table 1. Data concerning hydroxyl equivalents of the obtained solutions on a solids basis, and weight average molecular weight of the produced copolymers are shown in Table 2 together with those obtained in Example 9. Additionally, HEA in Table 2 refers to hydroxylethyl acrylate, and other symbols have the same meanings as in Table 1, respectively.

(kinetic friction Coefficient): It was measured with a kinetic friction coefficient meter (made by Kyowa Kagaku) under the following condition.

rubbing element: SUS Ball, load: 50 g,
rubbing speed: 20 cm/min.

(Adhesion): The coat was cut crosswise at intervals of 1 mm to make 100 pieces of squares. Thereto, an adhesion tape was applied as a load was imposed thereon, and then peeled apart therefrom. Then, the number of the remain-squares was counted.

TABLE 2

| | Radical polymerizable group-containing dimethylpolysiloxane (A) | | | | | Radical polymerizable monomer containing hydroxyl group (parts by weight) | | another copolymerizable monomer (parts by weight) | | | | solvent (parts by weight) | |
|---|---|---|---|---|---|---|---|---|---|---|---|---|---|
| | $R_1$ | $R_2$ | m | n | parts by weight | HEMA | HEA | MMA | BMA | 2EHA | PFMA | Xylene | Cyclohexanone |
| EXAMPLE 9 | $CH_3$ | $-(CH_2)_3-$ | 2 | 25 | 30 | 1 | | 50 | 10 | | | 150 | |
| EXAMPLE 10 | H | $-(CH_2)_3-$ | 2 | 50 | 20 | 3.7 | | 40 | 10 | 10 | | 150 | |
| EXAMPLE 11 | $CH_3$ | $-(CH_2)_3-$ | 2 | 50 | 30 | | 1 | 40 | 10 | | | 150 | |
| EXAMPLE 12 | $CH_3$ | $-(CH_2)_3-$ | 1 | 12 | 40 | 4.1 | | 40 | | | 5 | 50 | 100 |
| EXAMPLE 13 | $CH_3$ | $-(CH_2)_3-$ | 0 | 25 | 35 | | 0.7 | 35 | | 10 | | 150 | |

| | ε-caprolactone (parts by weight) | solid part (%) | Hydroxyl Equivalent of Solid part (g/mol) | weight average molecular weight determined by GPC |
|---|---|---|---|---|
| EXAMPLE 9 | 9 | 40 | 13,000 | 31,000 |
| EXAMPLE 10 | 16.3 | 40 | 3,550 | 33,000 |
| EXAMPLE 11 | 19 | 40 | 11,800 | 28,000 |
| EXAMPLE 12 | 10.9 | 40 | 3,190 | 27,000 |
| EXAMPLE 13 | 19.3 | 40 | 16,600 | 28,000 |

EXAMPLE 14

The graft copolymer solution obtained in Example 1 was diluted with a methyl ethyl ketone-ethyl acetate (1/1 by weight) mixture so that the resulting solids concentration might become 20%, coated on an Al plate using a spinner, and air-dried for 24 hours at room temperature to form a transparent coat having a thickness of 20 μm. The thus formed coat was examined for appearance, contact angle of water, kinetic friction coefficient, adhesion, weather resistance, flexibility and solvent resistance. The results obtained are shown in Table 3.

(Appearance): Whether the coat was sticky or not to the touch was observed.

The case of sticky coat was indicated by a cross mark, while the case of non-sticky coat was indicated by a circle mark.

(Contact Angle of Water): It was measured with a Contact Angle Meter CA-A (made by Kyowa Kagaku).

(Weather Resistance): A luster retaining rate after 1,000 hours' exposure in a sunshine weather meter was measured.

A circle mark indicates that the coat had a luster retaining rate of 90% or above, while a cross mark indicates that the coat had a luster retaining rate less than 90%.

(Flexibility): A bending test was carried out using a mandrel 3 mm in diameter under the condition of 20° C.—65% RH. A circle mark indicates that neither cleft not peeling was generated, while a cross mark indicates that some clefts and peelings were caused.

(Solvents Resistance): The coat was soaked in toluene.

After 1-hour lapse, it was taken out of the toluene and its appearance was observed.

A circle mark indicates that any change was not observed, while a cross mark indicates that dissolution occurred.

TABLE 3

| | graft copolymer | external appearance | contact angle of water (°) | kinetic friction coefficient | adhesion | weather resistance | flexibility | solvent resistance |
|---|---|---|---|---|---|---|---|---|
| EXAMPLE 14 | EXAMPLE 1 | ○ | 103 | 0.18 | 100 | ○ | ○ | X |
| EXAMPLE 15 | EXAMPLE 2 | ○ | 95 | 0.21 | 100 | ○ | ○ | X |
| EXAMPLE 16 | EXAMPLE 3 | ○ | 104 | 0.15 | 100 | ○ | ○ | X |
| EXAMPLE 17 | EXAMPLE 4 | ○ | 99 | 0.20 | 100 | ○ | ○ | X |
| EXAMPLE 18 | EXAMPLE 5 | ○ | 103 | 0.14 | 100 | ○ | ○ | X |
| EXAMPLE 19 | EXAMPLE 6 | ○ | 102 | 0.15 | 100 | ○ | ○ | X |
| EXAMPLE 20 | EXAMPLE 7 | ○ | 104 | 0.22 | 100 | ○ | ○ | X |
| EXAMPLE 21 | EXAMPLE 8 | ○ | 103 | 0.20 | 100 | ○ | ○ | X |
| EXAMPLE 22 | EXAMPLE 9 | ○ | 102 | 0.19 | 100 | ○ | ○ | X |
| EXAMPLE 23 | EXAMPLE 10 | ○ | 101 | 0.16 | 100 | ○ | ○ | X |
| EXAMPLE 24 | EXAMPLE 11 | ○ | 100 | 0.16 | 100 | ○ | ○ | X |
| EXAMPLE 25 | EXAMPLE 12 | ○ | 106 | 0.19 | 100 | ○ | ○ | X |
| EXAMPLE 26 | EXAMPLE 13 | ○ | 102 | 0.20 | 100 | ○ | ○ | X |
| COMP. EXAMPLE 3 | COMP. EXAMPLE 1 | ○ | 101 | 0.18 | 100 | ○ | X | X |
| COMP. EXAMPLE 4 | COMP. EXAMPLE 2 | X | 95 | 0.30 | 100 | ○ | ○ | X |
| EXAMPLE 27 | EXAMPLE 1 | ○ | 104 | 0.16 | 100 | ○ | ○ | ○ |

TABLE 3-continued

| | graft copolymer | external appearance | contact angle of water (°) | kinetic friction coefficient | adhesion | weather resistance | flexibility | solvent resistance |
|---|---|---|---|---|---|---|---|---|
| EXAMPLE 28 | EXAMPLE 2 | ○ | 95 | 0.20 | 100 | ○ | ○ | ○ |

EXAMPLES 15 to 26

The same operations as in Example 14 were performed, except that each of the graft copolymer solutions obtained in Examples 2 to 13 was used in the place of the graft copolymer solution obtained in Example 1, and properties of each coat formed were evaluated in the same ways as adopted in Example 14. The results obtained are shown in Table 3.

COMPARATIVE EXAMPLES 3 AND 4

Each of the formed coats was examined for properties by performing the same operations as in Example 14, except that each of the graft copolymer solutions obtained in Comparative Examples 1 and 2 was used in the place of the graft copolymer solution obtained in Example 1. The results shown in Table 3 were obtained.

EXAMPLE 27

The graft copolymer solution obtained in Example 1 was diluted with a methyl ethyl ketone-ethyl acetate (1/1 by weight) mixture so that the resulting solids concentration might become 20%. A 100 pts. wt. portion of this diluted solution was further mixed with 4.1 pts. wt. of isocyanurate combined HDI and 0.05 pt. wt. of dibutyltin dioctate, coated on an Al plate using a spinner, and air-dried for 3 days at room temperature to form a transparent coat having a thickness of 20 μm. The thus formed coat was examined for properties in the same ways as in Example 14, and the results shown in Table 3 were obtained.

EXAMPLE 28

A coat was formed in the same manner as in Example 14, except that the graft copolymer solution prepared in Example 2 was used instead of the graft copolymer solution prepared in Example 1 and the content of isocyanurate combined HDI was changed to 0.4 pt. wt. The thus formed coat was examined for properties, and the results shown in Table 3 were obtained.

The data set forth in Table 3 have demonstrated that the covering compositions containing the graft copolymers of this invention as their major component are excellent in water repellability, lubricity, weather resistance, flexibility and so on.

Moreover, it has been substantiated that compounding with a cross-linking agent can impart excellent solvent-resisting property to the coats relating to this invention.

What is claimed is:

1. A graft copolymer comprising a vinyl polymer as a trunk polymer, and both organopolysiloxane and polylactone as branch polymers wherein said branch polymers, respectively, exhibit units represented by formulae (a) and (b), respectively:

(a) 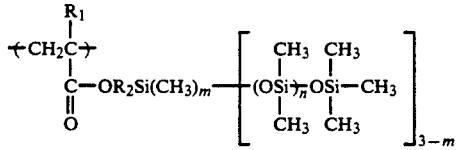

wherein
$R_1$ is hydrogen or methyl;
$R_2$ is a divalent hydrocarbon containing 1-11 carbon atoms, whose carbon chain may be interrupted by an oxygen atom;
m is 0, 1 or 2; and
n represents an average degree of polymerization, and is 0-200;

(b) 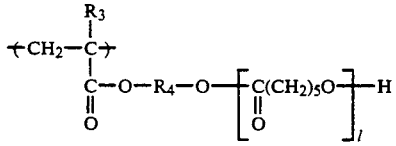

wherein
$R_3$ is hydrogen or methyl;
$R_4$ is a divalent hydrocarbon containing 2-4 carbon atoms;
l represents an average degree of polymerization, and is 3-20; and
wherein the fraction of unit (a) is 5-80 wt. %, and that of unit (b) is 2-50 wt. %.

2. A graft copolymer of claim 1, wherein the fraction of unit (a) is 10-60 wt. %, and that of unit (b) is 5-30 wt. %.

3. A composition comprising a solvent and a graft copolymer of claim 1.

4. A graft copolymer comprising a vinyl polymer as a trunk polymer, and both organopolysiloxane and polylactone as branch polymers wherein said branch polymers, respectively, exhibit units represented by formulae (a) and (b), respectively:

(a) 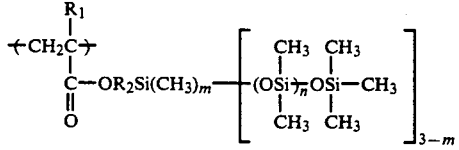

wherein
$R_1$ is hydrogen or methyl;
$R_2$ is a divalent hydrocarbon containing 1-11 carbon atoms, whose carbon chain may be interrupted by an oxygen atom;
m is 0, 1 or 2; and
n represents an average degree of polymerization, and is 0-200;

(b) 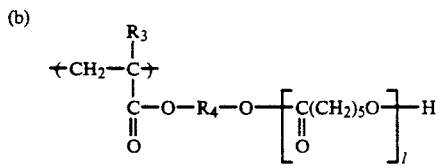

wherein
- $R_3$ is hydrogen or methyl;
- $R_4$ is a divalent hydrocarbon containing 2–4 carbon atoms; and
- $l$ represents an average degree of polymerization, and is 3–20;
- wherein the fraction of unit (a) is 5–80 wt. %, and that of unit (b) is 2–50 wt. %; and
- wherein the vinyl trunk polymer is obtained from monomer units selected from the group consisting of (metha)acrylic acid, an alkyl ester of (metha)acrylic acid, a hydroxyalkyl ester of (metha)acrylic acid, an acid amide of (metha)acrylic acid, a perfluoro ester of (metha)acrylic acid, styrene, fumaric acid, maleic acid, vinyltrimethoxysilane, τ-methacryloxypropyltrimethoxysilane, acrylonitrile, vinylpyrrolidone, vinyl acetate, a vinyl alkyl ether, and combinations thereof.

5. A graft copolymer according to claim 4, wherein said monomer is selected from the group consisting of an alkyl ester of (metha)acrylic acid, an acid amide of (metha)acrylic acid, or a perfluoro ester of (metha)acrylic acid.

6. A graft copolymer according to claim 4, wherein said monomer unit is methyl(metha)acrylate, butyl(metha)acrylate, 2-ethylhexyl(metha)acrylate, hydroxyethyl(metha)acrylate, perfluorodecylethyl(metha)acrylate, perfluorooctylethyl(metha)acrylate, perfluorohexylethyl(metha)acrylate, perfluorobutylethyl(metha)acrylate, acrylamide or mixtures thereof.

7. A graft copolymer comprising a vinyl polymer as a trunk polymer, and both organopolysiloxane and polylactone as branch polymers wherein said branch polymers, respectively, exhibit units represented by formulae (a) and (b), respectively:

(a) 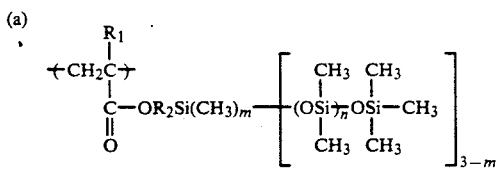

wherein
- $R_1$ is hydrogen or methyl;
- $R_2$ is a divalent hydrocarbon containing 1–11 carbon atoms, whose carbon chain may be interrupted by an oxygen atom;
- $m$ is 0, 1 or 2; and
- $n$ represents an average degree of polymerization, and is 0–200;

(b) 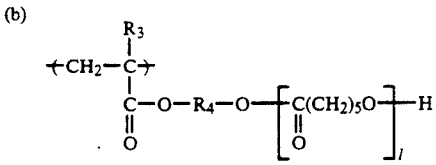

wherein
- $R_3$ is hydrogen or methyl;
- $R_4$ is a divalent hydrocarbon containing 4 carbon atoms; and
- $l$ represents an average degree of polymerization, and is 3–20;
- wherein the fraction of unit (a) is 5–80 wt. %, and that of unit (b) is 2–50 wt. %.

8. A graft copolymer comprising a vinyl polymer as a trunk polymer, and both organopolysiloxane and polylactone as branch polymers wherein said branch polymers, respectively, exhibit units represented by formulae (a) and (b), respectively:

(a) 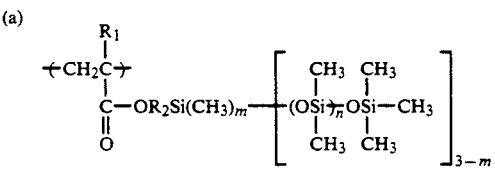

wherein
- $R_1$ is hydrogen or methyl;
- $R_2$ is a divalent hydrocarbon containing 1–11 carbon atoms, whose carbon chain may be interrupted by an oxygen atom;
- $m$ is 2; and
- $n$ represents an average degree of polymerization, and is 0–200;

(b) 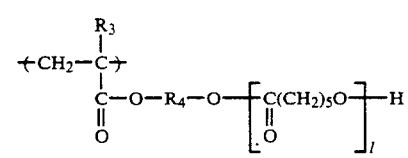

wherein
- $R_3$ is hydrogen or methyl;
- $R_4$ is a divalent hydrocarbon containing 2–4 carbon atoms; and
- $l$ represents an average degree of polymerization, and is 3–20;
- wherein the fraction of unit (a) is 5–80 wt. %, and that of unit (b) is 2–50 wt. %.

9. A graft copolymer comprising a vinyl polymer as a trunk polymer, and both organopolysiloxane and polylactone as branch polymers wherein said branch polymers, respectively, exhibit units represented by formulae (a) and (b), respectively:

(a) 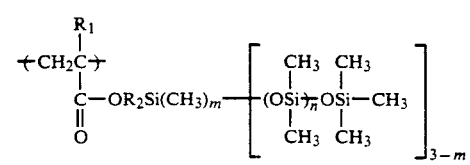

wherein
R₁ is hydrogen or methyl;
R₂ is a divalent hydrocarbon containing 1-11 carbon atoms, whose carbon chain may be interrupted by an oxygen atom;
m is 0; and
n represents an average degree of polymerization, and is 0-200;

(b)
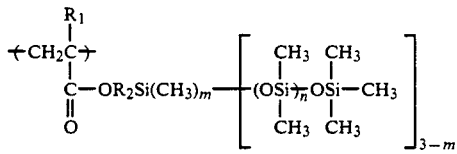

wherein
R₃ is hydrogen or methyl;
R₄ is a divalent hydrocarbon containing 2-4 carbon atoms; and
l represents an average degree of polymerization, and is 3-20;
wherein the fraction of unit (a) is 5-80 wt. %, and that of unit (b) is 2-50 wt. %.

10. A graft copolymer comprising a vinyl polymer as a trunk polymer, and both organopolysiloxane and polylactone as branch polymers wherein said branch polymers, respectively, exhibit units represented by formulae (a) and (b), respectively:

(a)
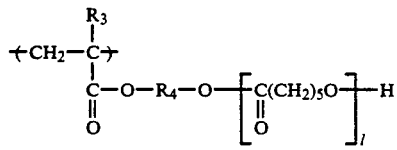

wherein
R₁ is hydrogen or methyl;
R₂ is a divalent hydrocarbon containing 1-11 carbon atoms, whose carbon chain may be interrupted by an oxygen atom;
m is 0, 1 or 2; and
n represents an average degree of polymerization, and is 100-200;

(b)
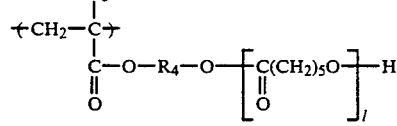

wherein
R₃ is hydrogen or methyl;
R₄ is a divalent hydrocarbon containing 2-4 carbon atoms; and
l represents an average degree of polymerization, and is 3-20;
wherein the fraction of unit (a) is 5-80 wt. %, and that of unit (b) is 2-50 wt. %.

11. A graft copolymer comprising a vinyl polymer as a trunk polymer, and both organopolysiloxane and polylactone as branch polymers wherein said branch polymers, respectively, exhibit units represented by formulae (a) and (b), respectively:

(a)
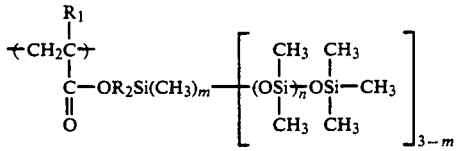

wherein
R₁ is hydrogen or methyl;
R₂ is a divalent hydrocarbon containing 1-11 carbon atoms, whose carbon chain may be interrupted by an oxygen atom;
m is 0, 1 or 2; and
n represents an average degree of polymerization, and is 0-200;

(b)
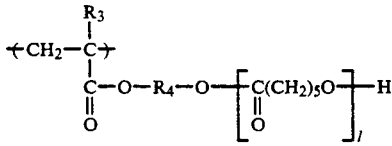

wherein
R₃ is hydrogen or methyl;
R₄ is a divalent hydrocarbon containing 2-4 carbon atoms; and
l represents an average degree of polymerization, and is 3-20;
wherein the fraction of unit (a) is 5-80 wt. %, and that of unit (b) is 2-50 wt. %; and
wherein units of formula (a) of the branch polymer are obtained by polymerization of monomers selected from the group consisting of:

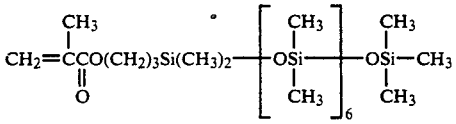

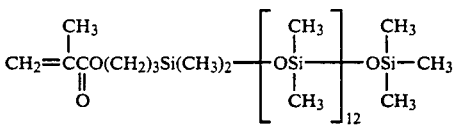

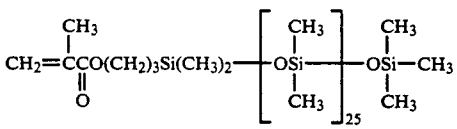

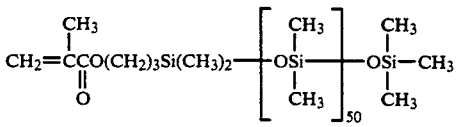

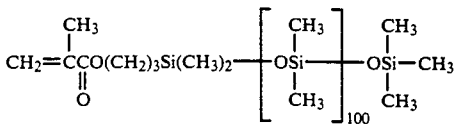

-continued
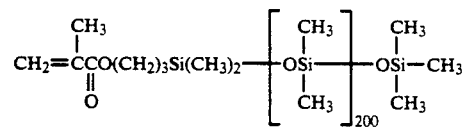
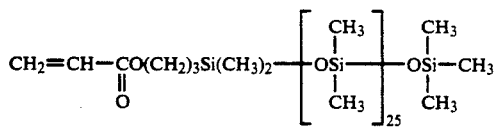
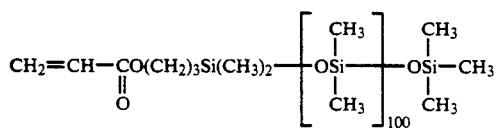
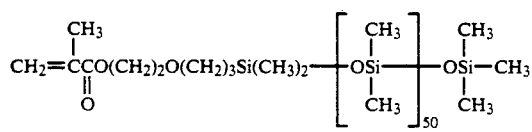
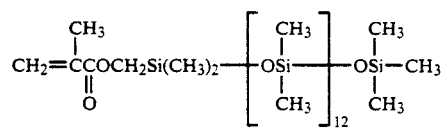
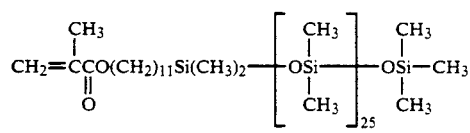
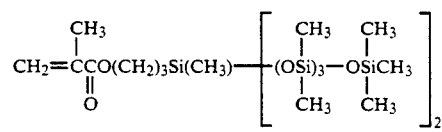
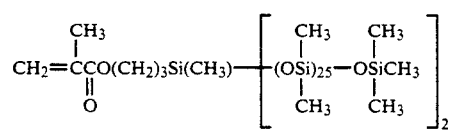
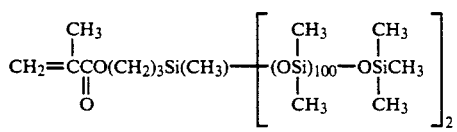
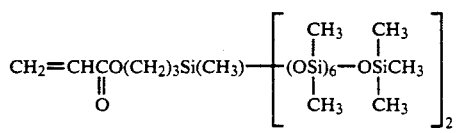
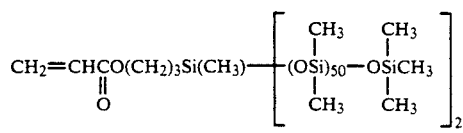
-continued
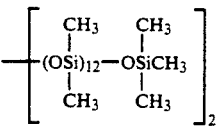
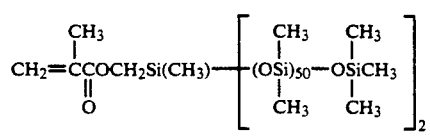
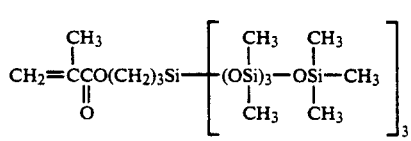
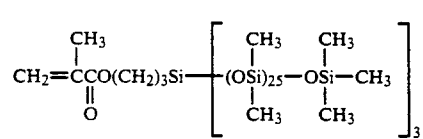
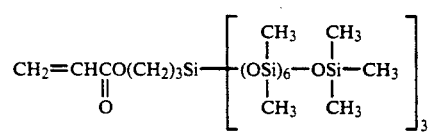
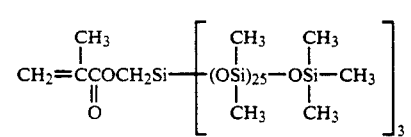
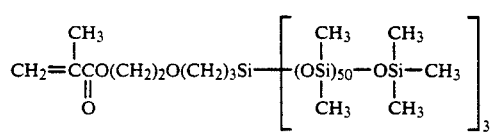
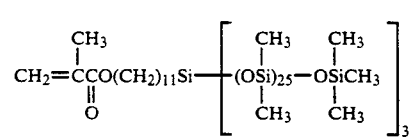
and
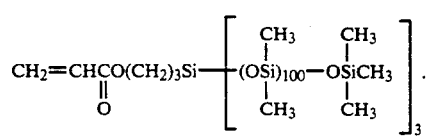
12. A graft copolymer comprising a vinyl polymer as a trunk polymer, and both organopolysiloxane and polylactone as branch polymers wherein said branch polymers, respectively, exhibit units represented by formulae (a) and (b), respectively:

(a) 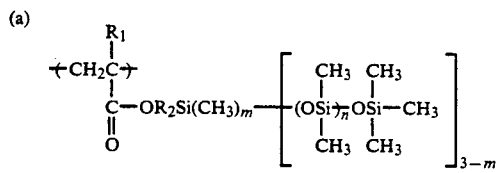

wherein

R₁ is hydrogen or methyl;

R₂ is a divalent hydrocarbon containing 1-11 carbon atoms, whose carbon chain may be interrupted by an oxygen atom;

m is 0, 1 or 2; and n represents an average degree of polymerization, and is 0-200;

(b) 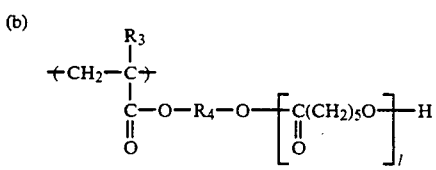

wherein

R₃ is hydrogen or methyl;

R₄ is a divalent hydrocarbon containing 2-4 carbon atoms; and l represents an average degree of polymerization, and is 3-20;

wherein the fraction of unit (a) is 5-80 wt. %, and that of unit (b) is 2-50 wt. %; and wherein units of formula (b) of the branch polymer are obtained by polymerization of monomers selected from the group consisting of:

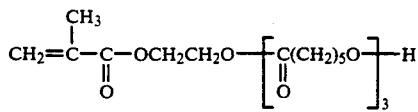

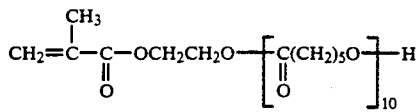

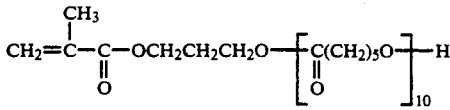

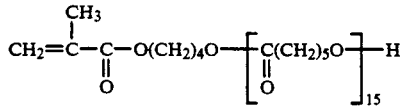

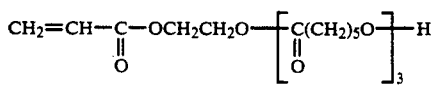

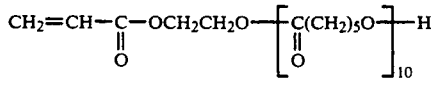

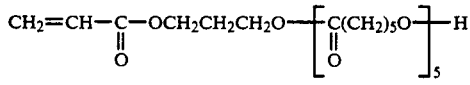

and

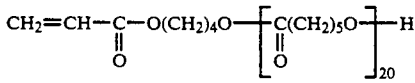

* * * * *